Figures 1, 2, 3:
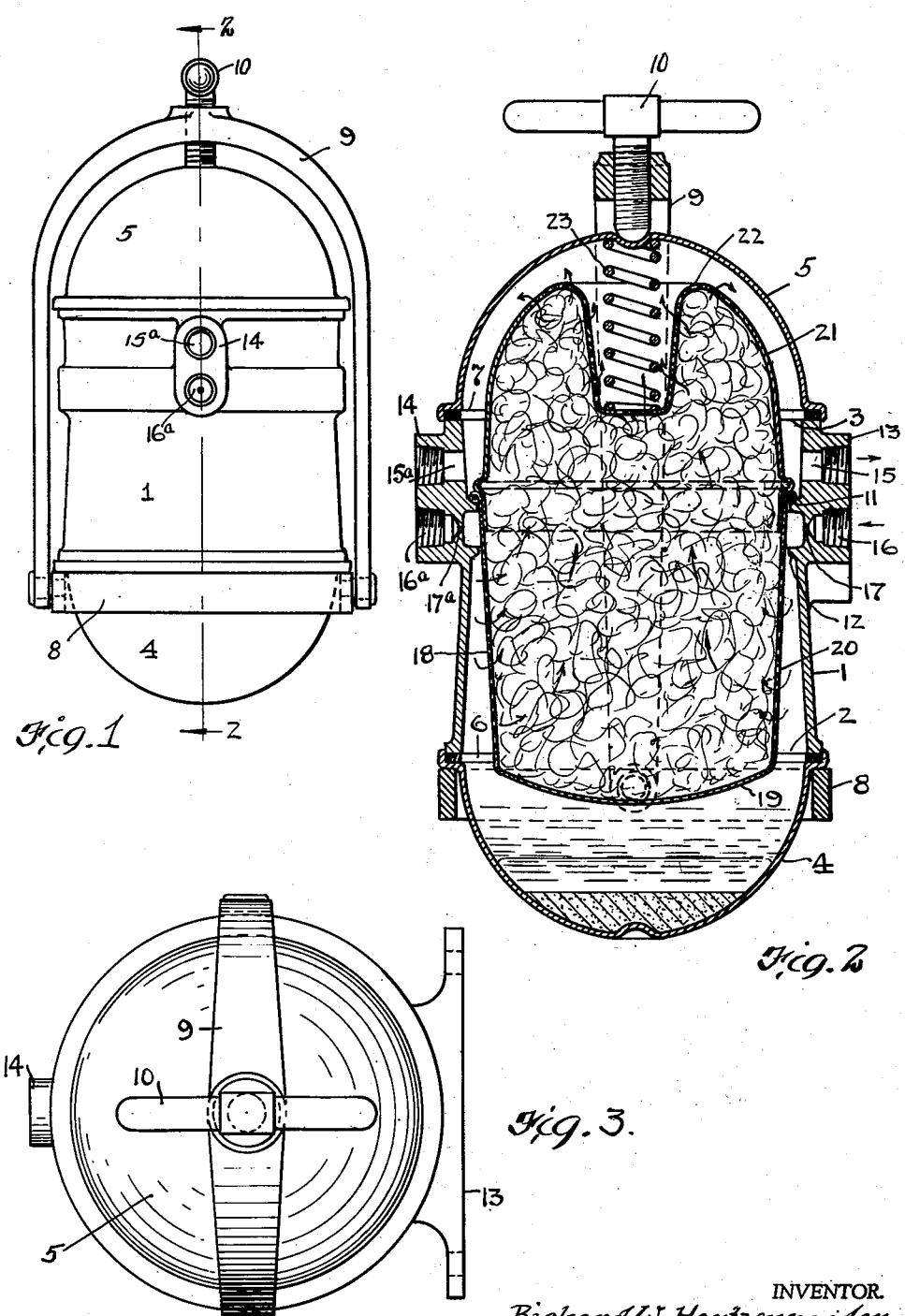

June 1, 1943.  R. W. HAUTZENROEDER  2,320,725
FILTER
Filed Oct. 4, 1938

INVENTOR.
Richard W. Hautzenroeder
BY Jay, Oberlin & Jay
ATTORNEYS.

Patented June 1, 1943

2,320,725

UNITED STATES PATENT OFFICE 2,320,725

FILTER

Richard W. Hautzenroeder, Mansfield, Ohio

Application October 4, 1938, Serial No. 233,224

5 Claims. (Cl. 210—131)

This invention relates as indicated to filters and the device comprising my invention is particularly applicable for use as a filter to be employed in connection with internal combustion engines for the purpose of filtering the oil ordinarily employed in the crankcase or sump for lubricating the same.

In order to operate most efficiently, a filter of this character should possess the following characteristics, viz:—

The oil from the crankcase or sump of the engine should enter the filter at a definite metered rate of flow, proportional to the capacity of the filter and not at such a rapid rate as to appreciably decrease the oil pressure established for the lubrication of the engine system.

The oil to be filtered, entering the filter, should flow in a downward direction with a progressively diminishing velocity in order to make possible gravity separation of any water, sludge, carbon or metallic particles which may be included in the oil so that these foreign materials will not pass into the filtering medium to block or clog the same.

The sump or sediment chamber should be provided at the lowest point in the filter in order to receive and hold any foreign material thus separated by gravity from the oil. The filter should be so constructed that this collecting sump for the foreign material may be emptied or cleaned without disturbing any of the pressure connections to the filter or without disturbing the filter medium itself. The filter should also be constructed so that in renewing the filter medium, the sump for the gravity-separated material will always be emptied or drained as a matter of course.

The filter medium employed for the purpose of filtering the oil should be made available in package form to facilitate marketing the same, as well as installation and removal from the filter without the employment of special tools. In the interest of economy, insofar as the use of the filter is concerned, the filtering medium or element should be so arranged in the filter proper that the same may be replaced or re-packed by the user thereof without special tools, equipment or material.

Since the filtering medium becomes clogged more rapidly at the point where the dirty oil enters the same, than at the point where the clean oil leaves the filtering medium, the filtering medium in the filter should be so arranged that the greatest possible area thereof is presented to the incoming dirty oil.

The filter should be so constructed as to provide a by-pass or relief for the oil normally forced through the filter medium when the pressure reaches a predetermined value. This is necessary since subjecting the filter medium to pressures above a predetermined value normally results in a packing or compressing of the filter material and if the same is sufficiently compressed, damage may result to the filter structure itself. This by-pass or relief must also be so arranged that the oil flowing therethrough will not agitate the sediment which has accumulated in the previously identified sump so that when the by-pass is called upon to function, it will not discharge such accumulated sediment into the engine.

The filter should be so constructed and arranged as to be capable of attachment directly to the engine with all oil passages arranged in the engine block or alternatively mounted separately from the engine and connected thereto by means of suitable tubes, pipe or flexible hose.

Finally, the entire assembly should lend itself to the most economical methods of production so that the original installation cost, as well as subsequent replacement of the filtering element or medium, will represent the greatest possible economy as compared with product replacement of the engine oil supply.

It is a principal object of my invention to provide a filter having all of the characteristics and advantages above enumerated.

Other objects of my invention will appear as the description proceeds.

To the accomplishment of the foregoing and related ends, said invention, then, consists of the means hereinafter fully described and particularly pointed out in the claims, the annexed drawing and the following description setting forth in detail certain structure embodying the invention, such disclosed means constituting, however, but one of various structural forms in which the principle of the invention may be used.

In said annexed drawing—

Fig. 1 is a side elevational view of one form of apparatus constructed in accordance with the principles of my invention; Fig. 2 is a transverse sectional view of the structure illustrated in Fig. 1, taken on a plane substantially indicated by the line 2—2; and Fig. 3 is a top plan view of the apparatus illustrated in Fig. 1.

Referring now more specifically to the drawing, and more especially to Figs. 1 and 2, the apparatus herein illustrated which embodies the preferred form of construction of apparatus made in accordance with my invention consists of a casing generally indicated at 1, the opposite ends 2 and 3 of which are preferably of the same size, and respectively removably closed by a lower head 4 and an upper head 5. The openings 2 and 3 are preferably of the same size and shape so that the same form of construction may be employed for either head 4 or 5, i. e., the two heads are made interchangeable to facilitate economy in manufacture. Gaskets such as 6 and 7 are interposed between the respective heads 4 and 5 and the casing 1 in order to insure a fluid seal at this point.

The casing 1 and the heads 4 and 5 are maintained in assembled relation by means of a clamping device which includes a clamping ring 8, a U-shaped arm 9 and a clamping screw 10 arranged in the manner illustrated in the drawing. The clamping screw 10 is so arranged as to be operated by hand, i. e., without any special wrenches, so that the entire apparatus may be assembled and disassembled without the use of special tools.

The interior of the casing 1 is provided with an annular radially inward projection 11, which along with a similar projection 12, defines an annular passage around the inner periphery of the casing 1. The casing 1 is provided with bosses 13 and 14 on opposite sides thereof. These bosses are respectively provided with openings 15 and 15a and 16 and 16a. The openings 16 and 16a communicate with the annular space between the projections 11 and 12 through restricted orifices 17 and 17a. The openings 16 and 16a are the inlet openings for the oil to be filtered and communicate with the lower chamber in the filter and the openings 15 and 15a are the discharge openings for the filtered oil and communicate with the upper chamber. Two sets of bosses and their corresponding openings are provided for the following purpose, viz:

When the filter is mounted directly on the body of the engine, this is accomplished by bolting the boss, or pad 13 directly to the engine thus placing openings 15 and 16 in communication with the engine. In such case the openings 15a and 16a will be closed with suitable plugs. If, however, the filter is to be mounted separately from the engine the openings 15 and 16 will be plugged, the boss 13 used as the means by which the filter is supported and the filter then placed in communication with the engine by suitable connections associated with openings 15a and 16a.

The restricted orifice 17 or 17a serves as a means for limiting the reduction in pressure effected by a connection of the oil filter to the circulating pressure system of the engine and also limits the rate of flow through the filter.

Positioned within the casing 1 is a filter element in the form of a cylindrical cartridge, generally indicated at 18. The cartridge 18 is in two parts, the lower part 19 being provided with a perforated lateral wall 20 providing ingress openings for the oil to be filtered and the upper part 21 provided with a perforated portion 22 providing egress openings for the oil which has been filtered.

The two elements 19 and 21 are telescopically assembled as shown most clearly in Fig. 2, the element 19 being provided with a rolled bead or flange which rests on the annular projection 11 of the casing and the upper member 21 being provided with an annular bead whereby the extent to which the upper member enters the lower member is limited.

The assembly 18 is held on the seat 11 and the members 19 and 21 of such assembly held in assembled relation by means of a spring 23 which is placed under compression as the upper head 5 is clamped on the casing by means of a hand-screw 10.

The operation of the above described apparatus is briefly as follows:

The dirty oil from the engine which is to be filtered by the device enters the latter, either by the opening 16 or the opening 16a. The rate of flow of the oil into the filter is determined by the restricted orifice 17. The oil entering the filter flows first into the annular space between the annular projections 11 and 12 which serves to distribute the oil around the periphery of the filter. From such annular space the oil is discharged downwardly around the outside surface of the lower element 19 of the filter cartridge.

It will be observed that as soon as the oil passes downwardly below the annular projection 12, it enters an area which is progressively increasing in width as the oil flows downwardly. Due to the fact that a portion of the oil enters the element 19 at the perforations in the very lower portion of the outer wall area 20, taken with the increasing width of the space between the casing 1 and such wall, as the oil descends, results in imparting to the oil a progressively decreasing velocity as the column of oil descends until the velocity of the stream at the lower edge of the perforated area 20 becomes zero. This progressively decreasing downward velocity permits the water, sludge and heavier particles of metal and carbon to precipitate out and settle in the sump formed by the lower head 4. The oil flows upwardly through the filter medium contained in the cartridge 18, outwardly through the egress orifices 22 to be collected by the head 5 and then returned through the openings 15 or 15a to the engine.

Should the filtering element become clogged due to lack of attention or should excessive pressures be encountered for any reason, the pressure building up in the lower chamber, i. e., below the seal effected by the seat 11, such pressure will be effective to unseat the cartridge from the seat 11, permitting the oil to by-pass over such seat, i. e., around the filter cartridge, without being forced to flow therethrough; thus if excessive pressures are encountered, they are directly vented back to the return opening 15 without damaging either the filter cartridge or the body of the filter itself. It will also be observed that when this by-pass functions, the by-passed oil does not disturb the sediment in the bottom of the filter so that the same is not washed back into the engine.

When it is desired to replace the cartridge and/or to clean out the sump in the bottom of the head 4, this may be readily accomplished by merely loosening the hand-screw 11 sufficiently to permit disengagement of the clamp 9, thus freeing both top and bottom heads, permitting their removal. The cartridge may then be removed without any special tools and if desired, the metal case thereof may be re-packed with a suitable filter material or a new factory assembled cartridge may be inserted.

It will be observed that the filter may be renewed and cleaned without disturbing any of the pressure connections, i. e., oil lines to the filter. It will also be observed that whenever the filter is disassembled for renewing the cartridge therein, the bottom head, i. e., the sump containing the foreign material which is settled out of the oil, is automatically removed by the unclamping action, thus insuring that each time the filter cartridge is renewed, the sump will also be cleaned.

Since the filtering medium is enclosed within a metal cartridge, any tendency of the same to become swollen during use will not result in the filter cartridge becoming stuck in the body of the filter which is an undesirable characteristic of many present-day forms of construction.

As indicated, the filter cartridges for renewal at periodic intervals may be supplied as factory assembled units or if the user of the filter so desires, he may himself disassemble the sections of the metal cartridge, remove the fouled filter medium and replace the same with new material so that the purchase of a factory assembled unit is not essential.

Other modes of applying the principle of my invention may be employed instead of the one explained, change being made as regards the structure herein disclosed, provided the means stated by any of the following claims or the equivalent of such stated means be employed.

I, therefore, particularly point out and distinctly claim as my invention:

1. In a device of the character described, the combination of a casing open at opposite ends, a removable filter member in said casing separating the interior thereof into upper and lower chambers, an inlet passage communicating with said lower chamber, an outlet passage communicating with said upper chamber, an annular flange within said casing just below said inlet passage for distributing the incoming fluid about the periphery of said filter member, said filter member being imperforate adjacent said flange, removable identical cup shaped head members closing the opposite ends of said casing, and a single external clamping means for securing said heads to said casing, said annular flange extending circumferentially around the interior of said casing and extending toward the filter member but being spaced therefrom.

2. In a device of the character described, the combination of a casing open at opposite ends, a filter member in said casing separating the interior thereof into upper and lower chambers, an inlet passage communicating with said lower chamber, an outlet passage communicating with said upper chamber, removable head members for closing the opposite ends of said casing, a flange about the exterior of the lower of said head members, a removable ring engaging the lower surface of said flange, a U-shaped member, the two ends of which are pivotally secured to opposite sides of said ring and the curve of which embraces the upper of said head members, and means interposable between the curve of said U-shaped member and the upper of said head members to secure said head members to said casing.

3. In a device of the character described, the combination of a casing, a filter member in said casing separating the interior thereof into upper and lower chambers, the side walls of said member closely approaching said casing in the upper portion of said lower chamber, but gradually withdrawing therefrom towards the lower end of said lower chamber, an inlet passage communicating with the upper end of said lower chamber, and an outlet passage adjacent said inlet passage and communicating with said upper chamber, said casing having two, vertically spaced, interior flanges extending circumferentially therearound, said filter member being seated upon the upper of said two flanges and said lower flange being disposed below said inlet.

4. In a device of the character described, the combination of a casing, a filter member in said casing separating the interior thereof into upper and lower chambers, a feed chamber extending peripherally around said filter member and positioned adjacent the upper part of said lower chamber, said casing having an inlet passage communicating with said feed chamber, said filter element having an imperforate portion extending completely around the periphery of said filter element at the level of said feed chamber, said filter element extending downwardly into said lower chamber, there being perforations on said filter element below the feed chamber whereby said feed chamber feeds fluid from said inlet in a direction downwardly into said lower chamber before the same passes upwardly through said filter member to said upper chamber, and an outlet passage communicating with said upper chamber.

5. In a device of the character described, the combination of a casing, a filter member in said casing separating the interior thereof into upper and lower chambers, the side walls of said filter member closely approaching said casing in the upper portion of said lower chamber but gradually withdrawing therefrom toward the lower end of said lower chamber to provide a sump about and below the filter member in said lower chamber, a feed chamber extending peripherally around said filter member and positioned adjacent the upper part of said lower chamber, said casing having an inlet passage communicating with said feed chamber, said filter element having an imperforate portion extending completely around the periphery of said filter element at the level of said feed chamber, said filter element extending downwardly into said lower chamber, there being perforations on said filter element below the feed chamber whereby said feed chamber feeds fluid from said inlet in a direction downwardly into said sump before the same passes upwardly through said filter member to said upper chamber, and an outlet passage communicating with said upper chamber.

RICHARD W. HAUTZENROEDER.